United States Patent [19]

Landsness

[11] 4,171,641

[45] Oct. 23, 1979

[54] METHOD FOR MEASURING UNIFORMITY OF TIRES

[75] Inventor: Clifford A. Landsness, Akron, Ohio

[73] Assignee: The B. F. Goodrich Company, Akron, Ohio

[21] Appl. No.: 924,127

[22] Filed: Jul. 13, 1978

[51] Int. Cl.² ............................................. G01M 17/02
[52] U.S. Cl. ..................................................... 73/146
[58] Field of Search .................................. 73/146, 462

[56] References Cited

U.S. PATENT DOCUMENTS

| | | | |
|---|---|---|---|
| 3,754,358 | 8/1973 | Shively et al. | 51/324 |
| 3,780,573 | 12/1973 | Reus | 73/146 |
| 3,867,838 | 2/1975 | Gerresheim | 73/146 |
| 4,023,404 | 5/1977 | Brendel | 73/146 |

*Primary Examiner*—Donald O. Woodiel
*Attorney, Agent, or Firm*—Joseph Januszkiewicz

[57] ABSTRACT

Tire uniformity measuring method wherein imbalanced forces are measured and then removed from the final forces produced by a high-speed tire to give a final readout of forces which are the true dynamic road wheel contact forces on a tire under load.

9 Claims, 9 Drawing Figures

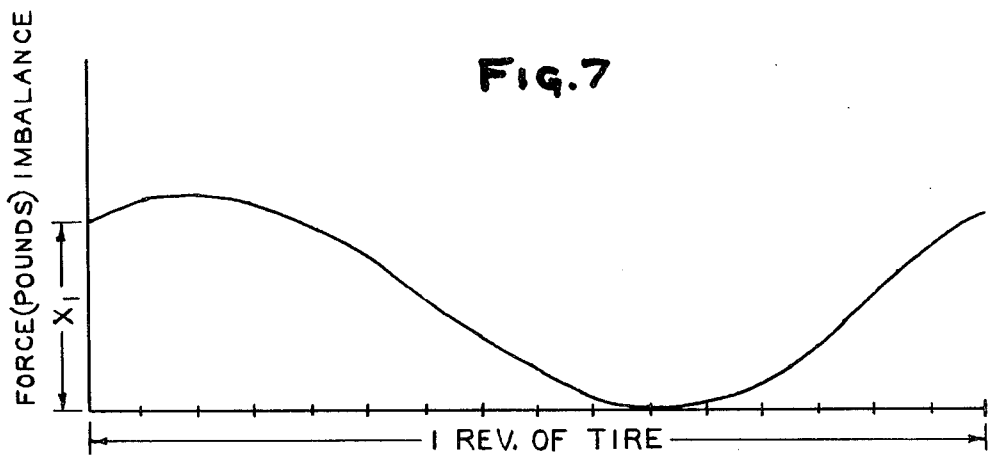
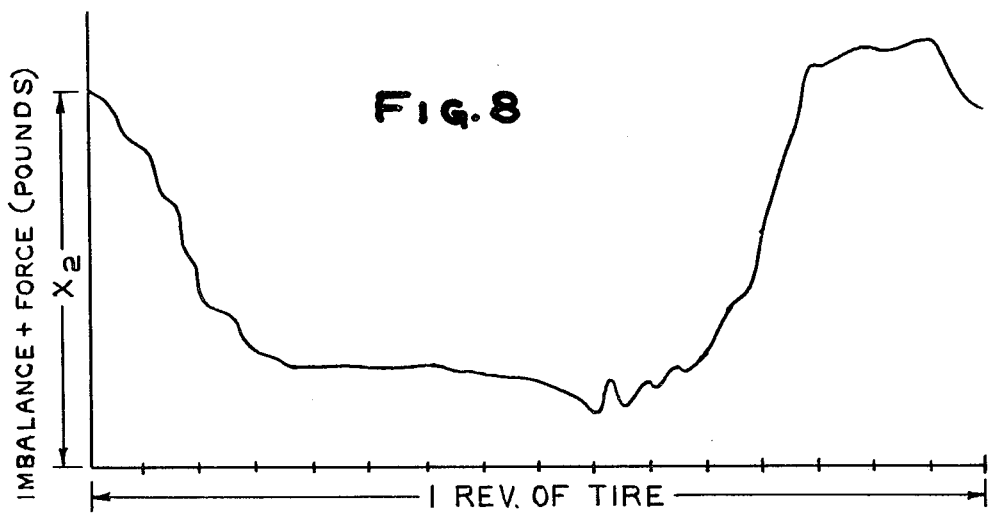
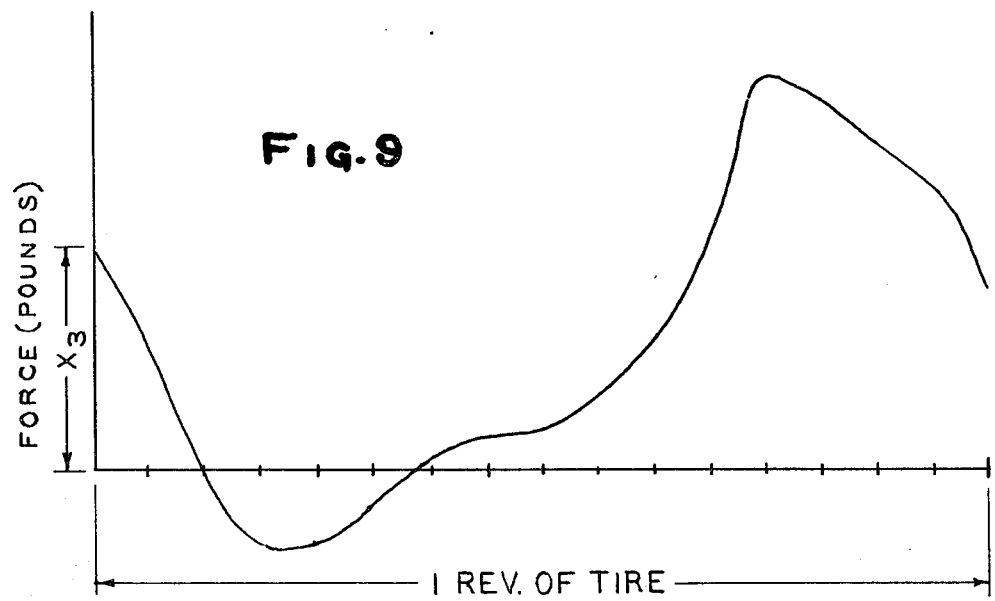

025

METHOD FOR MEASURING UNIFORMITY OF TIRES

BACKGROUND OF THE INVENTION

The present invention pertains to a method for measuring forces produced by a tire at high speed.

The measuring of tires were initially for radial and lateral run-out, however with the advent of better highways and higher speeds it was necessary to measure more of the dynamically induced force variations which were generated by the tire itself. The force variations are attributable to one or more factors in the tire such as splice variations or irregularities, variations of dimensions in the materials, irregularities in the fabric construction as in calendaring or construction of breakers, belts or cutting and splicing of fabric material as well as other deviations that are introduced into a tire due to mechanical imperfection such as inherent in the tire building machines as well as human inaccuracies.

The means used in making these measurements includes a wheel and axle assembly on which the tire to be tested is mounted. A rotating load wheel is applied against the test tire at a predetermined loading and as the tire is rotated, the variations in the forces are recorded, indicating the amount of variation in force the tire exerts on the load wheel.

The present invention overcomes many disadvantages of the past force variance measuring machine, providing a rapid and accurate means for measuring forces at high speed running on a road wheel or load-wheel wherein the imbalanced forces are separated and removed from the radial force variance that is measured at the axle of the tire being tested to give a final contact or road surface forces which may be recorded. Such operation may be performed automatically without stopping the operation.

SUMMARY OF THE INVENTION

A tire is loaded onto a tire rim inflated and then rotated at high speed. The centrifugal forces are measured and the data is then stored. These forces are the imbalanced forces in the tire. The tire and tire rim are then rotated while subjected to a predetermined load and the radial and drag forces which are force variance now measured under load are corrected for the imbalance forces previously measured to give a resulting corrected measured forces which reflects the dynamic contact forces of the tire due to contact with the load wheel or a road surface.

BRIEF DESCRIPTION OF THE DRAWINGS

FIG. 7 is a wave form for one revolution of a tire and wheel rim assembly showing the imbalance of a tire at high speed without load.

FIG. 8 is a wave form for one revolution of a tire and wheel rim assembly showing the forces on a tire at high speed under load at the wheel axle as force variance.

FIG. 9 is a wave form for one revolution of a tire and wheel rim assembly showing the forces on a tire at high speed under load but with the imbalance forces removed providing a contact force which is resultant force.

DESCRIPTION OF THE PREFERRED EMBODIMENT

Figure 2:
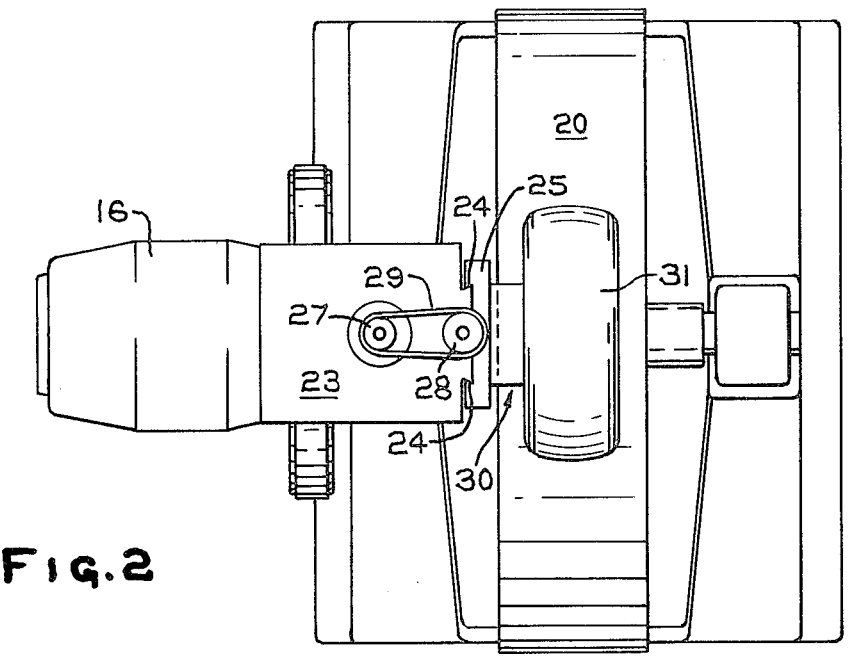
FIG. 2 is a plan view of the force variance apparatus.
Figure 1:
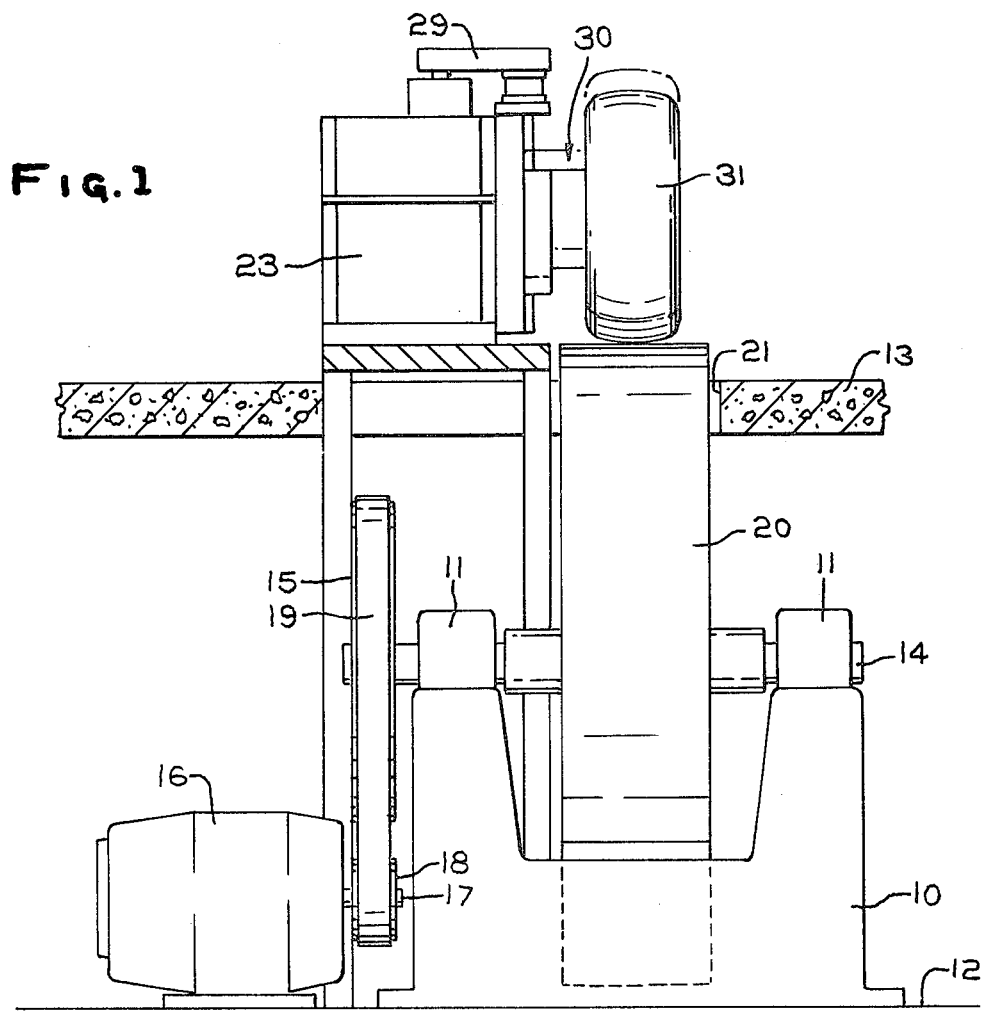
FIG. 1 is a side elevational view of the dynamic force variance measuring apparatus.

Referring to the drawings wherein like reference characters designate like or corresponding parts throughout the several views there is shown in FIG. 1 a support member or support means 10 having a pair of spaced trunnions or bearing support members 11. Such support member 10 is mounted on a suitably support or subfloor 12 below a main support or floor 13. Axle 14 is journaled for rotation in bearing support members or trunnions 11. A pulley 15 is suitably keyed to one end of shaft 14. A variable speed motor 16 mounted on subfloor 12 having an output shaft 17 with a pulley 18 mounted thereon has a belt 19 trained thereon and onto pulley 15 so that the output of motor 16 drives pulley 15 and shaft 14. Suitably mounted on shaft 14 for rotation therewith is a load wheel 20. Main support or floor 13 has a cut-away portion 21 through which a portion of load wheel 20 projects. Suitably mounted above the main support 13 is a housing 23. The one side of housing 23 has a pair of guideways 24 for guiding a slide member 25 in a vertical direction toward and away from load wheel 20.

Figure 3:
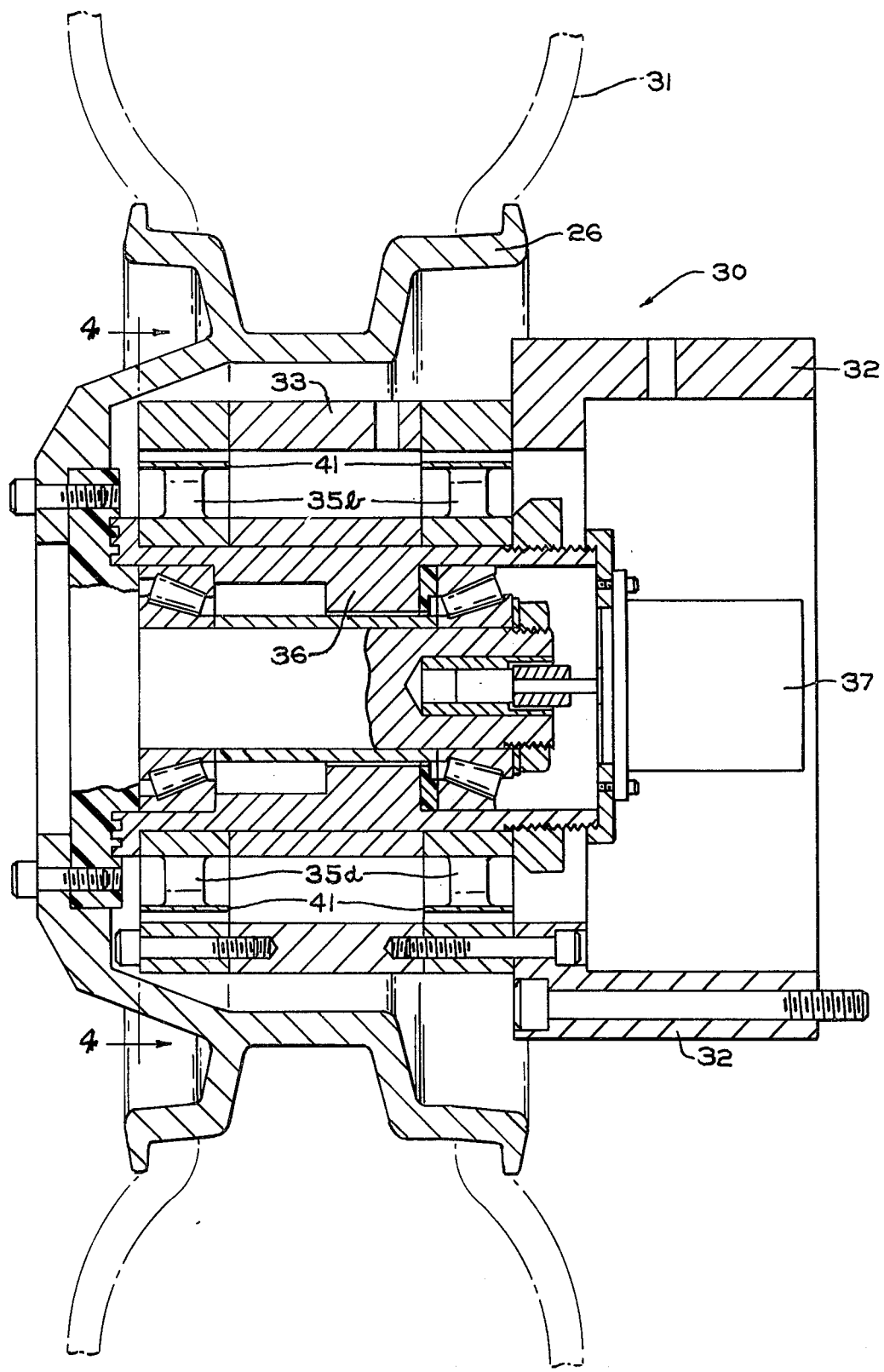
FIG. 3 is an enlarged cross-sectional view of a tire rim wheel assembly.
Figure 4:
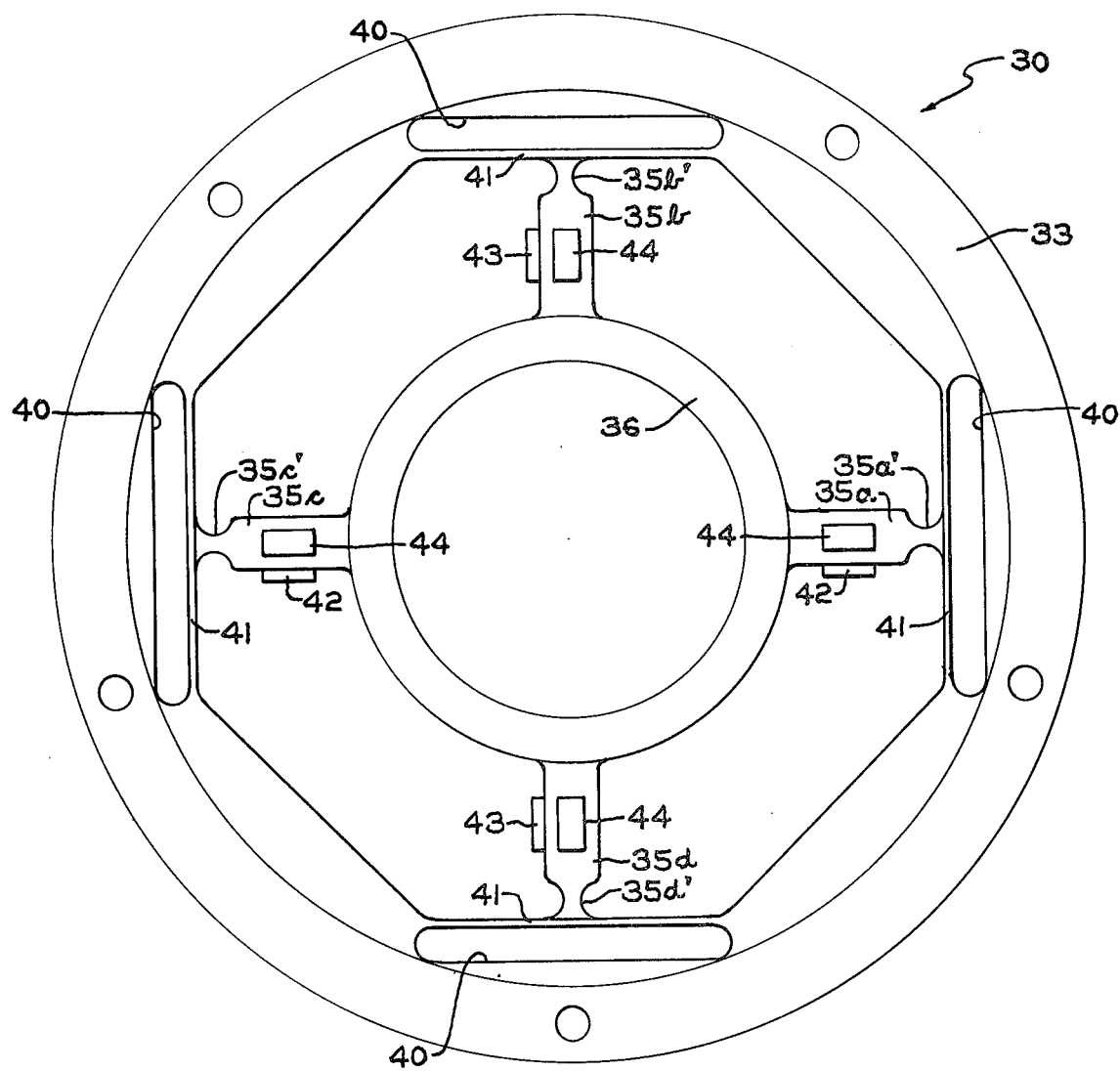
FIG. 4 is a side elevational view of rim wheel and strain gauges used in measuring the forces exerted by the tire.
Figure 5:
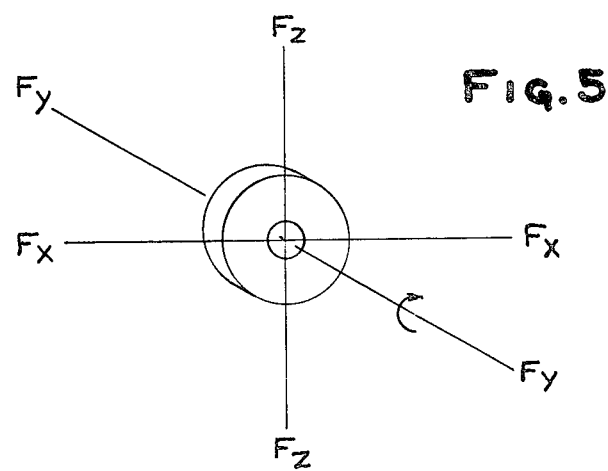
FIG. 5 is a diagrammatic showing of the forces on a tire and wheel assembly.
Figure 6:
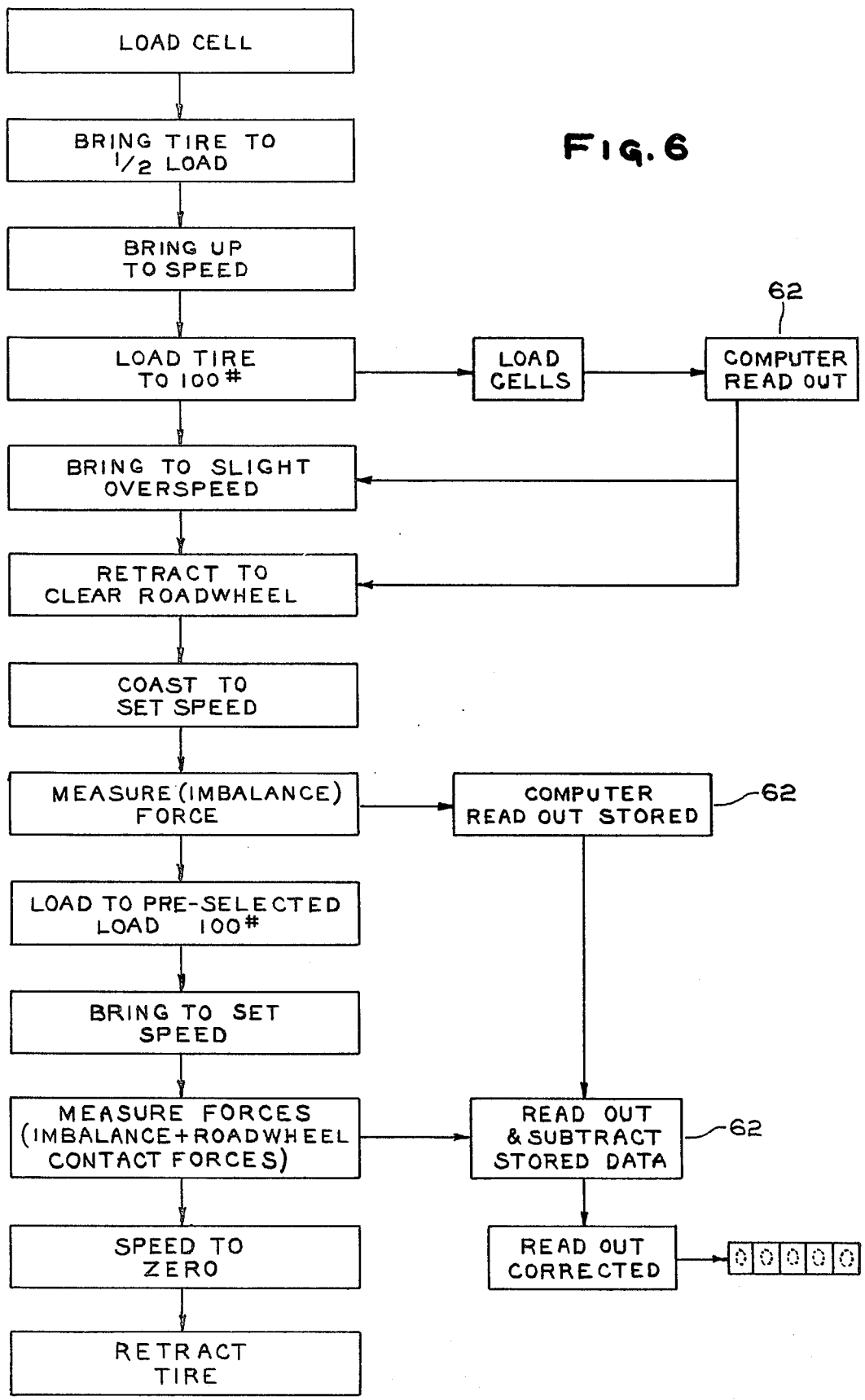
FIG. 6 is a block diagram of the procedure for measuring and correcting for imbalance to give a true dynamic force readout on a tire.

A reversible variable speed motor not shown is mounted in housing 23, having its output connected to a drive pulley 27. A pulley 28 mounted in alignment with pulley 27 and connected thereto by v-belt 29 drives a threaded rod which is adapted to move the slide member 25 toward or away from load wheel 20. Slide member 25 supports for rotation a tire rim or wheel 26 on which is mounted a tire 31. Interconnecting the tire rim 26 and slide 25 is a hub assembly 30 (FIG. 3). Hub assembly 30 has an outer hub 32 with a plurality of circumferentially spaced bores to facilitate the attachment to the slide member 25. An inner hub 33 interconnected with the outer hub 32 has pairs of radially inwardly extending spokes 35a, 35b, 35c, and 35d which spokes are attached to a central hub 36 to which is attached an encoder 37 to provide means for determining the location of portions of the hub assembly 30 and the tire 31 relative to other portions of the tire in a manner old and well known in the art. The respective outer end portions of the spokes 35a through 35d are reduced in cross section as at 35a'-35b'-35c' and 35d'. The inner hub 33 closely adjacent to the reduced end portions of the respective spokes 35a, 35b, 35c and 35d is recessed as at 40 to provide a thin web 41 which acts as a metal flex plate. Spokes 35a and 35c have strain gauges 42 suitably bonded thereto for measuring radial forces $F_z$, while spokes 35b and 35d have strain gauges 43 suitably bonded thereto for measuring the drag force variance $F_x$ thereon. Strain gauges 44 mounted on spokes 35a, 35b, 35c, and 35d are located ninety degrees relative to the strain gauges 42 and 43 to measure the lateral forces $F_y$.

In the operation of the described structures the operator actuates motor 16, which then rotates loadwheel 20. The tire to be tested is then lowered by actuation of the motor controlling slide 25 on which rim 26 and tire 31 is located into contact with rotating loadwheel 20. The tire is loaded to one-half of its load (assume load rating 1500 lb) at which it is to be tested and then the tire and wheel are brought up to the predetermined speed at which it is desired to test the tire. In the example chosen it is to be 60 mph. Such speed can be any speed above 5 mph although a higher speed is preferred. The tire is then loaded to one hundred pounds by rotating pulleys 27 and 28 to move slide member 52 to the desired position relative to loadwheel 20. The strain gauges provide signals proportional to the loading, which signals are communicated to the computer 62. The speed of the tire 31 is then brought to a slight overspeed, after which the computer retracts the tire 31 to clear the tire 31 from the loadwheel 20. The tire 31 is then coasted to the preselected speed of 60 mph as set forth in the example chosen, afterwhich the computer reads and stores the centrifugal force due to imbalance of the tire for one revolution. These forces are measured on the strain gauges 42, 43 and 44. These imbalanced forces are read and stored in computer means 62. The imbalanced centrifugal forces measured are components of the radial and drag forces $F_{z-1}$ and $F_{x-1}$ respectively. The tire 31 is then brought back into contact with the loadwheel 20 by moving slide member 25 and tire 30 into contact with the loadwheel 20 to the same prior pre-selected set load, which in the example selected is 1500 pounds. The loading is a function of the tire carrying capacity and accordingly is loaded to reflect a simulated condition. The tire 31 is then brought up to the pre-selected set speed (60 mph). The radial, drag and lateral forces which are referred to as force variance at the axle of the wheel rim are then measured by the strain gauges 42, 43 and 44 and the appropriate signals which are in synchronism with the imbalance forces in a manner old and well known in the art are fed into the computer 62 where the force variance including the drag and radial forces (imbalance plus tire contact force) $F_{z-2}$, $F_{x-2}$ and $F_y$ are recorded. The wave form of the imbalance is in synchronism with the other wave forms of the force variation at the axle and the resultant contact force in a manner well known in the art. Note U.S. Pat. No. 3,754,358 which synchronizes the pulse with the tire rotation or note U.S. Pat. Nos. Christie 3,553,903, Karsai 2,695,520, Rader 3,574,973 and Shively et al 3,681,877, all incorporated herein by reference. The computer then subtracts the prior stored imbalance forces $F_{z-1}$ and $F_{x-1}$ from the newly read and stored force $F_{z-2}$ and $F_{x-2}$ respectively to give a resultant readout of the contact force which is the radial force $F_z$ and drag force $F_x$. These contact force measurements are dynamic readings which include the proper phase, frequency and amplitude to reflect more accurately the true radial and drag forces in a tire. In lieu of the computer automatic stored and corrected forces, the calculations can be performed manually, however, the automatic readout is faster and more accurate. FIGS. 7, 8 and 9 depict the above described operation. FIG. 7 discloses the imbalance curve or waveform of a tire at high speed without any load thereon in one revolution, wherein the abscissa represents the different points on the tire as it rotates and the ordinate represents the imbalance in pounds of force. The curve depicts the imbalance as a nonlinear function similar to a sine curve.

The initial imbalance is designated as $X_1$ (one unit of force). FIG. 8 depicts the force variance that is picked up by the strain gauges on the axle of the tire under test at high speed and under load which in the example chosen was 1500 pounds. The wave form of FIG. 8 includes the imbalance due to the centrifugal forces as well as the contact forces (the road contact forces). The ordinate is calibrated in units of force as in FIG. 7 and the initial force $X_2$ includes the imbalance force $X_1$ of FIG. 7. FIG. 9 is the resultant force arrived at by subtracting the imbalance forces of FIG. 7 from the forces of FIG. 8. The wave form of FIG. 9 is for one revolution of the tire with the ordinate in units of force wherein $X_3$ is the resultant force arrived at by subtracting $X_1$ from $X_2$. The resultant force $X_3$ represents the contacts force between the tire and the road surface.

Various modifications are contemplated and may obviously be resorted to by those skilled in the art without departing from the described invention, as hereinafter defined by the appended claims, as only a preferred embodiment has been disclosed.

I claim:

1. A method of determining the uniformity of wheels comprising the steps of mounting a wheel on a rotatable rim, rotating said wheel to a predetermined speed, measuring the imbalance forces on said wheel without load thereon, thence rotating said wheel at said predetermined speed under a predetermined load, measuring the force variance on said wheel under said predetermined load and speed, subtracting said imbalance forces from said force variance to give a resultant contact force.

2. A method of determining the uniformity of wheels as set forth in claim 1 wherein said predetermined speed can be in a range from 35 miles per hour to 100 miles per hour.

3. A method of determining the uniformity of a rotary body comprising the steps of rotating said body at a predetermined speed, measuring the incremental imbalance forces on said tire as a function of one revolution of said body to give a first signal, thence rotating said body at said predetermined speed and at a predetermined load thereon, measuring the force variance incrementally on said body as a function of one revolution of said body to give a second signal that is in synchronism with said first signal, and subtracting said first signal from said second signal to give a resultant dynamic contact force measurement for said wheel that represents the road contact forces on said rotary body under load.

4. A method of determining the uniformity of said rotary body as set forth in claim 3 wherein said predetermined speed is above five miles per hour.

5. A method of determining the uniformity of said rotary body as set forth in claim 4 wherein said imbalance force is a nonlinear force due to centrifugal force of imbalance as a function of time.

6. A method of determining the uniformity of said rotary body as set forth in claim 5 wherein said predetermined load is above one thousand pounds.

7. A method of determining the uniformity of a rotary body comprising the steps of: rotating said body at a predetermined speed without load; producing by strain gauges coupled to said rotary body a first signal having an amplitude which varies as a function of the imbalance in said rotary body; rotating said body at said predetermined speed and at a predetermined load; in synchronism with the speed and location of said first signal; producing by strain gauges coupled to said rotary body a second signal having an amplitude which varies as a function of the force variance of said rotating body; and subtracting said first signal from said second signal to give a resultant contact force that reflects the true nonuniformity forces of said rotating body as it traverses the road surface.

8. A method of determining the uniformity of a rotary body as set forth in claim 7 wherein said first and second signals are in synchronism to reflect the corresponding locations on said rotary body.

9. A method of determining the uniformity of a rotary body as set forth in claim 8 wherein each of said signals is taken over one full revolution of said rotating body.

* * * * *